United States Patent [19]

Schier

[11] 3,853,050
[45] Dec. 10, 1974

[54] APPARATUS FOR PEELING FRUIT SUCH AS A LEMON AND SLICING THE RIND

[76] Inventor: Gustave Schier, 2700 22nd St., San Francisco, Calif. 94110

[22] Filed: Apr. 30, 1973

[21] Appl. No.: 355,892

[52] U.S. Cl..................... 99/590, 30/123 R, 99/591
[51] Int. Cl............................................... A23n 7/00
[58] Field of Search ............................. 94/584–596, 94/539–545; 83/913; 30/113.1, 114, 123 R, 279

[56] References Cited
UNITED STATES PATENTS

| | | | |
|---|---|---|---|
| 1,615,304 | 1/1927 | Korner et al........................... | 99/589 |
| 1,631,854 | 6/1927 | Carroll.................................. | 99/590 |
| 1,699,034 | 1/1929 | Spencer et al........................ | 99/590 |
| 2,210,974 | 8/1940 | Deprume .............................. | 99/590 |
| 2,342,892 | 2/1944 | Prinz..................................... | 99/593 |
| 2,562,818 | 7/1951 | Polk et al.............................. | 99/589 |
| 2,570,071 | 10/1951 | Polk et al.............................. | 99/590 |
| 3,555,947 | 1/1971 | Fram..................................... | 83/913 |

*Primary Examiner*—John W. Huckert
*Assistant Examiner*—Stuart S. Levy

[57] ABSTRACT

An apparatus for peeling and slicing a lemon or the like. An elongated knife extending longitudinally of the fruit is inserted between the meat of the fruit and the rind. The knife is then revolved about a circular path of travel around a base piece to simultaneously separate the meat from the rind and to cut the latter into longitudinally extending slices. Ejector means is provided for urging the cut slices outwardly from between the cutter blades. The invention also provides for cutting the rind transversely in a diametral plane.

9 Claims, 7 Drawing Figures

PATENTED DEC 10 1974

3,853,050

SHEET 1 OF 2

APPARATUS FOR PEELING FRUIT SUCH AS A LEMON AND SLICING THE RIND

This invention relates to an apparatus for peeling fruits having an exocarp such as lemons and oranges. In addition, the invention provides means for slicing the rind simultaneously with the peeling operation.

In many beverages it is preferable to include a slice of the rind of a fruit, such as a lemon, and it is customary to twist the slice before adding it to the drink to squeeze some of the oil from the rind. Such a slice of rind is generally called a lemon twist.

The main object of the present invention is to provide an apparatus for quickly and efficiently separating the meat of the fruit from the rind and also cutting the rind into slices which may be added to the beverage as desired.

Other objects and advantages will be apparent from the following specification and from the drawings.

Figure 1:
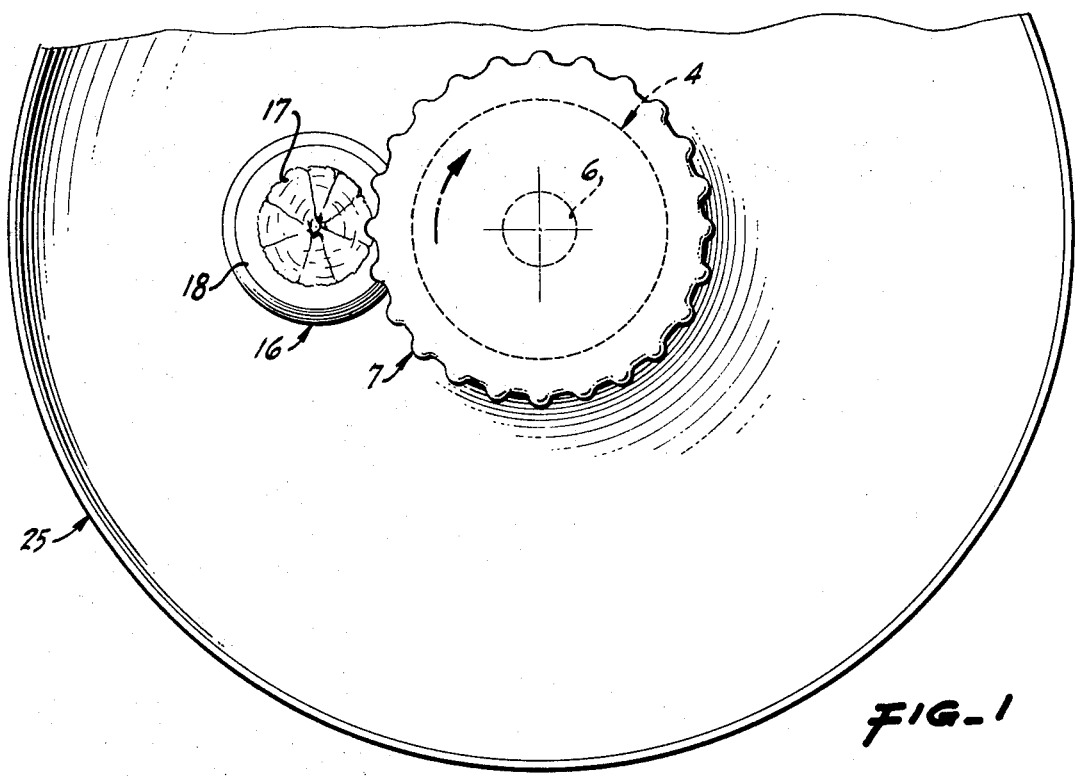
FIG. 1 is a top plan view of a peeler and slicer incorporating the invention.
Figure 2:
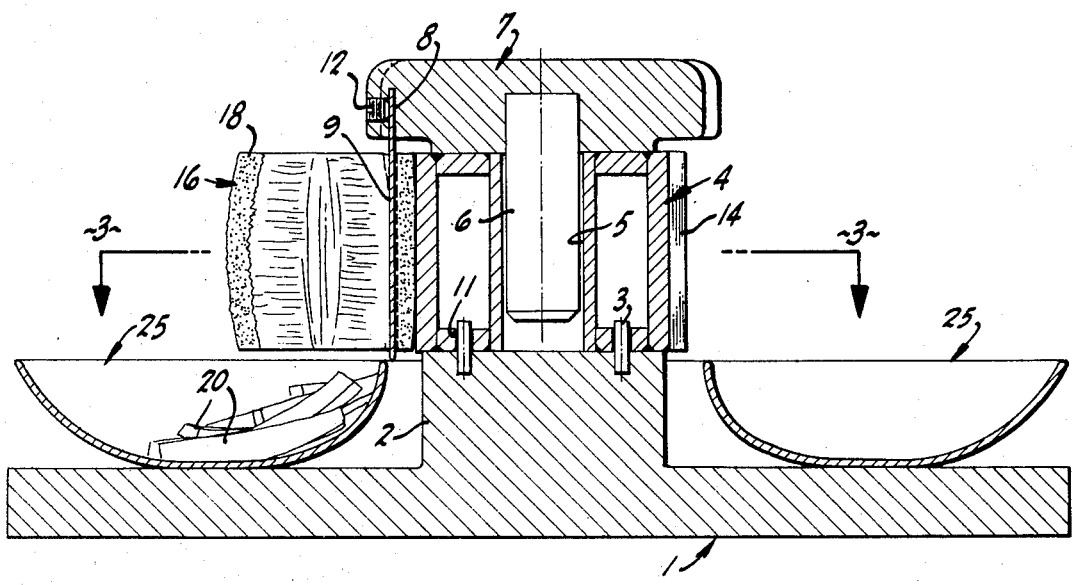
FIG. 2 is a vertical cross section of the device of FIG. 1.

In detail, and first with reference to FIGS. 1 and 2, the apparatus includes a horizontally extending support designated 1, which may be placed on any suitable surface. Extending upwardly from support 1 centrally of the same is a boss 2 provided with a plurality of upwardly extending pins 3. The boss 2 is adapted to receive thereon a base generally designated 4 formed with a cylindrical periphery and a central axially extending hole 5 which is adapted to receive therein a shaft 6 which is secured at its upper end to a manually rotatable knob 7. Holes 11 in the bottom of the base receive pins 3 therein.

Figure 4:
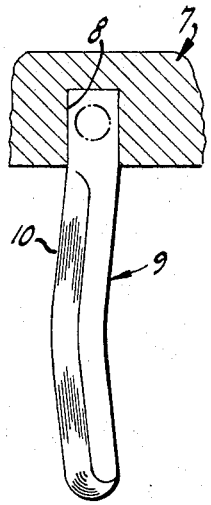
FIG. 4 is a vertical section through the turning knob as taken in a plane indicated by lines 4—4 of FIG. 3 and showing the peeling knife in elevation.

At a point adjacent its outer periphery the knob 7 is provided with an axially extending slot 8 in which is received the upper end of an elongated knife 9 of curved cross section (see FIG. 4). This knife 9 extends axially of the base 4 and may be secured to the knob 7 by a set screw 12.

Figure 3:
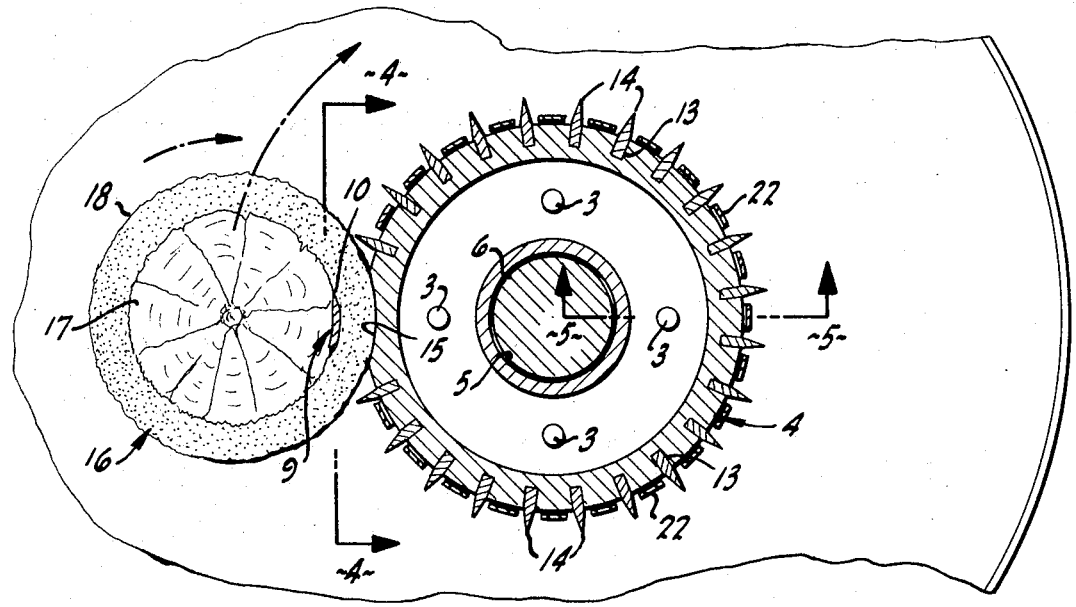
FIG. 3 is a horizontal cross sectional view of the apparatus taken in a plane indicated by lines 3—3 of FIG. 2 and showing a lemon at the starting position.

The base 4 is provided with a plurality of radially outwardly opening axially extending slots 13 in which are press fitted a plurality of cutting blades 14. As best seen in FIG. 3 the blades 14 are equally spaced apart around the entire periphery of base 4 except that at the starting point of the peeling and cutting operation, three blades are omitted to provide a space for the adjacent periphery of the fruit 16. At said starting point the base is slightly recessed as at 15 to facilitate receiving the fruit. Such fruit 16 includes an inner meaty portion 17 and an outer rind 18. As seen in FIG. 3 the peeling knife 9 is inclined slightly to a tangent of base 4 so that the cutting edge 10 follows the juncture between the central meat 17 and the rind 18 as the lemon is revolved around the cutters 14.

In operation the end portions of the lemon are preferably cut off so that the central body portion of the lemon remains as shown in FIG. 2. The knob 7 is then grasped in the hand of the user with the knife 9 extending outwardly therefrom and said knife is inserted longitudinally into the lemon at a portion of the juncture between the meat and the rind as indicated in FIGS. 2 and 3. The assembly of the knob and lemon is then placed on the base 4 with the shaft 6 extending into the hole 5 and with the lemon 16 occupying the space from which the three cutter blades have been omitted (see FIG. 3). The knob 7 is then turned by the operator so that the blade 9 secured thereto revolves along a circular path slightly outwardly from the outer cutting edges of the blades 14 (FIG. 6).

Figure 6:
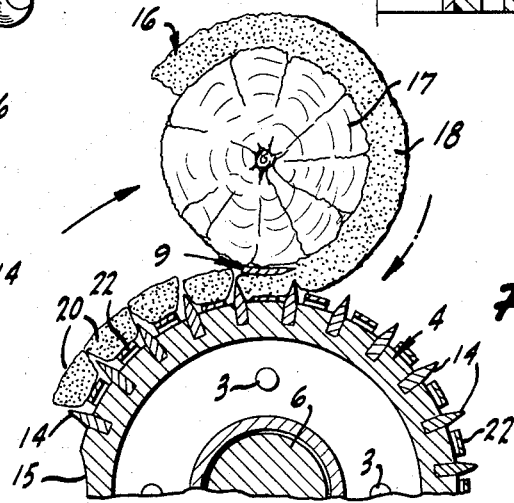
FIG. 6 is a view similar to FIG. 3 showing the lemon revolved a quarter turn from its starting position.

It will be noted from FIG. 6 that the lemon 16 rotates about its longitudinal axis as it revolves around the cutter blades 14 so that slices 20 are formed by the coaction of the cutter blades with the knife 9.

Figure 5:
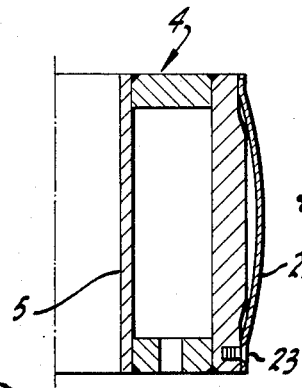
FIG. 5 is a section taken in a plane indicated by lines 5—5 of FIG. 3 showing the cutter support and an ejector spring.

In order to facilitate removal of the slices 20 a flat spring 22 is provided between each pair of cutter blades as best seen in FIG. 5. Each spring may be secured at one end by means of a rivet 23 to the base 4 with the other end of the spring free and with the central portion of the spring bowed as seen in FIG. 5. It will be understood as the knife 9 forces the rind into the spaces between cutter blades 14 the bowed spring 22 tends to flatten out and, as the knife 9 passes by, the spring 22 urges the cut slices 20 outwardly so as to facilitate their removal.

It has been found that the separation of the rind from the meat of the lemon is facilitated by forming the knife 9 as shown in FIG. 4. It will be noted that the cutting edge 10 of the knife is provided with a central portion that leads the remaining portions of the cutting edge thereby facilitating the separation step.

The above described apparatus lends itelf to use with an annular dish 25 which has an inside diameter slightly greater than the outside diameter of the row of cutting edges of the cutter blades 14 so that the dish 25 may receive the slices of rind and the meat 17 of the lemon as indicated in FIG. 2. After the peeling and slicing operation the knob 7 is removed so that the dish 25 may be raised vertically upwardly past the base 4. By securing the base 4 by means of the pins 3 entering corresponding apertures 11 in the base 4, the base 4 may also be readily removed from time to time to permit cleaning the same.

When the knife 9 is initially inserted into the space between the meat and the rind, it will be understood that the meat may be pierced slightly because of the curvature of the fruit. However at the same time the rind flattens out somewhat because of its resiliency. Such flattening of the rind is increased when the heel of the knife 9 pushes the rind against the base 4 as the slicing operation is commenced.

Figure 7:
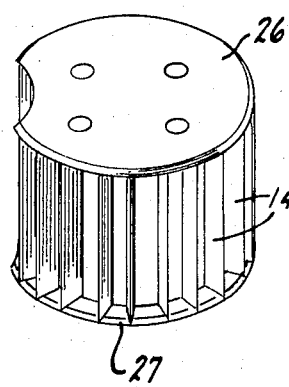
FIG. 7 is a perspective of a modified form of the cutter base.

The base 4 in the modified form of FIG. 7 is provided with the same cutter blades 14 as above described, and, in addition, is provided with circumferentially extending blades 26, 27 for cutting the rind transversely. In such a case the ends of the fruit need not be cut off before using the device although it is necessary to pierce the rind of the fruit at two points when inserting the knife 9.

I claim:

1. Apparatus for peeling a fruit such as a lemon or the like comprising:
    an elongated knife for insertion along a line on the meat and rind interface of said fruit,
    a fixed base formed with a generally cylindrical outer surface for engaging the rind of such fruit and flattening that portion of the rind between said surface and said knife;
    means supporting said knife for movement along a circular path of travel closely adjacent to said surface and coaxial therewith, with such rind in rolling engagement with said surface for separating the rind from the meat.

2. Apparatus according to claim 1 wherein said knife is secured to a rotatable member, means for rotatably supporting said member on said base.

3. Apparatus according to claim 1 wherein a plurality of outwardly projecting elements are provided on said surface parallel to the central axis of symmetry of said surface for engaging the rind.

4. Apparatus according to claim 1 wherein a plurality of radially outwardly directed cutter blades are carried by said base for slicing such rind during revolution of such fruit.

5. Apparatus according to claim 1 wherein said knife is substantially straight and is provided with a cutting edge formed with the central portion intermediate the ends thereof leading relative to the remainder of said knife in the direction of travel of said knife.

6. Apparatus for peeling and slicing the rind of a fruit such as a lemon comprising:
    a knife for insertion along a line on the meat and rind interface of said fruit,
    a base,
    a plurality of longitudinally extending cutter blades arranged on a cylindrical surface on said base parallel to the central axis of symmetry of said surface and with cutting edges directed radially outwardly of said cylindrical surface,
    means for revolving said knife about said blades for revolving such fruit with its rind engaging said blades successively for cutting such rind into slices.

7. Apparatus according to claim 6 wherein said base is provided with ejector means for urging the cut slices outwardly of said base.

8. Apparatus according to claim 6 wherein said base is provided with a peripherally extending cutter blade having a circular cutting edge for cutting said rind transversely.

9. Apparatus according to claim 8 wherein a peripherally extending cutter blade is provided at each end of said longitudinally extending blade.

* * * * *